(12) United States Patent
Amino et al.

(10) Patent No.: US 6,642,315 B2
(45) Date of Patent: Nov. 4, 2003

(54) RUBBER COMPOSITION AND CROSSLINKED RUBBER

(75) Inventors: Naoya Amino, Hiratsuka (JP); Masao Nakamura, Kawasaki (JP); Koichi Endo, Kawasaki (JP)

(73) Assignees: The Yokohama Rubber Co., Ltd., Tokyo (JP); Zeon Corporation, Tokyo (JP)

( * ) Notice: Subject to any disclaimer, the term of this patent is extended or adjusted under 35 U.S.C. 154(b) by 6 days.

(21) Appl. No.: 10/089,511

(22) PCT Filed: Jul. 31, 2001

(86) PCT No.: PCT/JP01/06609

§ 371 (c)(1), (2), (4) Date: Mar. 29, 2002

(87) PCT Pub. No.: WO02/10273

PCT Pub. Date: Feb. 7, 2002

(65) Prior Publication Data

US 2003/0055169 A1 Mar. 20, 2003

(30) Foreign Application Priority Data

Aug. 1, 2000 (JP) .................................... 2000-237642

(51) Int. Cl.⁷ ................................ C08L 7/00; C08L 9/00
(52) U.S. Cl. ..................... 525/232; 525/191; 525/241
(58) Field of Search ................................ 525/191, 232, 525/241

(56) References Cited

U.S. PATENT DOCUMENTS 6,127,488 A * 10/2000 Obrecht et al.
6,403,720 B1 * 6/2002 Chino et al.

FOREIGN PATENT DOCUMENTS

| JP | 10-204217 | 8/1998 |
|----|-----------|--------|
| JP | 2001-139729 | 5/2001 |
| WO | WO 02/10273 | 2/2002 |

* cited by examiner

Primary Examiner—Caixia Lu
(74) Attorney, Agent, or Firm—Rader, Fishman & Grauer PLLC

(57) ABSTRACT

A rubber composition containing (A) a sulfur cross-linkable rubber and (B) a conjugated diene-based rubber gel, having a toluene swelling index of 16 to 70, comprising 40 to 75% by weight of conjugated diene monomer units and 60 to 25% by weight of aromatic vinyl monomer units.

11 Claims, No Drawings

RUBBER COMPOSITION AND CROSSLINKED RUBBER

TECHNICAL FIELD

The present invention relates to a rubber composition and a cross-linked rubber, more specifically relates to a rubber composition and cross-linked rubber suitable for use for a tire tread having a superior wet grip and abrasion resistance.

BACKGROUND ART

In recent years, improvement in performance has been sought for the rubber compositions for tires for automobiles, etc. In particular, rubber compositions for tire treads superior in mechanical properties, abrasion resistance, grip on wet roads (i.e., wet grip properties), and low heat build-up have been sought.

In the past, large amounts of natural rubber have been used for tires. However, in many cases, it has been used mixed with the other rubbers in order to improve various aspects of performance. For example, polybutadiene rubber has been compounded to improve the abrasion resistance, while a styrene-butadiene polymer rubber has been compounded to improve the wet grip.

For example, Japanese Unexamined Patent Publication (Kokai) No. 8-231767 discloses a rubber composition superior in balance of abrasion resistance and wet grip by controlling the compatibility of the blend rubber.

However, if the abrasion resistance is improved, the wet grip is decreased, while if the wet grip is improved, the low heat build-up property is decreased. In this and other ways, there is often an antitomy in the relationship of various aspects of performance. It was difficult to obtain a rubber composition superior in all aspects of performance.

On the other hand, as the starting rubber, ordinarily one which does not have a gel structure has been strongly sought in consideration of the kneadability of the starting rubber and reinforcing material. However, in order to improve various aspects of performance, it has also been proposed to use rubber having a gel structure.

For example, Japanese Unexamined Patent Publication (Kokai) No. 3-37246 discloses a rubber composition containing a polychloroprene gel, while Japanese Unexamined Patent Publication (Kokai) No. 6-57038 discloses a rubber composition containing a polybutadiene gel. These rubber compositions are superior in low heat build-up property and abrasion resistance, but inferior in wet grip.

Japanese Unexamined Patent Publication (Kokai) No. 10-204217 discloses a rubber composition containing a styrene-butadiene copolymer rubber gel having a toluene swelling index of 1 to 15. Such a rubber composition is superior in low heat build-up property and wet grip, but sometimes suffers from the problems of an insufficient abrasion resistance, lower elongation at break and consequently lower mechanical properties, etc.

Further, Japanese Unexamined Patent Publication (Kokai) No. 11-80438 discloses a rubber composition comprising a pre-cross-linked rubber and an uncross-linked rubber latex. However, this kind of rubber composition gives a cross-linked rubber superior in mechanical properties, while not containing a reinforcing material, but suffers from the problems of lower mechanical properties or insufficient abrasion resistance or wet grip when containing a reinforcing material.

DISCLOSURE OF THE INVENTION

In consideration of the above situation, the object of the present invention is to provide a rubber composition superior in abrasion resistance and wet grip, without impairing the mechanical properties and low heat build-up property.

A further object of the present invention is to provide a cross-linked rubber superior in abrasion resistance and wet grip without impairing its mechanical properties and low heat build-up property.

In accordance with the present invention, there is provided a rubber composition comprising (A) a sulfur cross-linkable rubber and (B) a conjugated diene-based rubber gel, having a toluene swelling index of 16 to 70, comprising 40 to 75% by weight of conjugated diene monomer units and 60 to 25% by weight of aromatic vinyl monomer units.

In accordance with the present invention, there is also provided a cross-linked rubber produced by cross-linking the above rubber composition.

BEST MODE FOR CARRYING OUT THE INVENTION

The present invention will be described in further detail below.

The sulfur cross-linkable rubber (A) compounded into the rubber composition according to the present invention is not particularly limited so long as it is a rubber which can be cross-linked by sulfur, preferably it is one which includes double bonds corresponding to an iodine value of at least 2, more preferably 5 to 470, more preferably one containing conjugated diene monomer units and one having a Mooney viscosity(MLP$_{1+4}$, 100° C.) of preferably 10 to 150, more preferably 20 to 120. Note that the "iodine value" is represented by the number of grams of iodine chemically bonding with 100 g of a substance (i.e., rubber) and, in general, can be found by adding and assaying iodine chloride into glacial acetic acid.

The sulfur cross-linkable rubber (A) is preferably one which substantially has no gel structure or which even if having some gel structure, has a toluene swelling index of more than 70.

Specific examples of the sulfur cross-linkable rubber ingredient (A) used in the present invention are, for example, natural rubber, synthetic polyisoprene, polybutadiene, an acrylic acid alkyl ester-butadiene copolymer, a styrene-butadiene copolymer, a styrene-isoprene copolymer, a styrene-isoprene-butadiene copolymer, an acrylonitrile-butadiene copolymer, a partial hydrogenate of an acrylonitrile-butadiene copolymer, an isobutylene-isoprene copolymer, an ethylene-propylene-diene copolymer, and any mixtures thereof. Further, these rubbers may be previously extended by an extender oil.

Among these specific examples of the rubber ingredient (A), natural rubber, a synthetic polyisoprene, a styrene-butadiene copolymer produced by emulsion polymerization or solution polymerization and having 1 to 60% by weight, preferably 10 to 45% by weight, more preferably 15 to 25% by weight of styrene units, a polybutadiene having a high cis-1,4 bond content, for example, a cis-1,4 bond content of at least 90% by weight, and mixtures thereof are preferable. Natural rubber, synthetic polyisoprene, a polybutadiene having a high cis-1,4 bond content, and mixtures thereof are particularly preferable.

The average glass transition temperature (Tg) of the sulfur cross-linkable rubber (A) is preferably −40° C. or less, more preferably is −100 to −50° C. If the value is in this range, the balance of the physical properties is more superior.

Here, the "average glass transition temperature" is given by the following formula I, when mixing n types of sulfur cross-linkable rubbers (A) and designating the glass transition temperature of a sulfur cross-linkable rubber k as Tgk and the weight percentage of the sulfur cross-linkable rubber k in the entire weight of the sulfur cross-linkable rubber (A) as φk. Note that "Tgk" is the value measured at a rate of temperature rise of 2° C./min using a DSC (differential scan calorimeter):

Average glass transition temperature=″ΣTgk·φk(I)

The conjugated diene-based rubber gel (B) compounded in the rubber composition according to the present invention is a rubber containing conjugated diene monomer units and aromatic vinyl monomer units as essential ingredients and is composed of 40 to 75% by weight of conjugated diene monomer units, preferably 45 to 65% by weight, more preferably 50 to 60% by weight, and 60 to 25% by weight of aromatic vinyl monomer units, preferably 55 to 35% by weight, more preferably 50 to 40% by weight, and has a toluene swelling index of 16 to 70, preferably 20 to 65, more preferably 20 to 40.

If the amount of the conjugated diene monomer units of the conjugated diene-based rubber gel (B) is small, the low heat build-up property and abrasion resistance are inferior, while conversely if the amount of the conjugated diene monomer units is large, the wet grip is inferior.

If the amount of the aromatic vinyl monomer units of the conjugated diene-based rubber gel (B) is small, the wet grip is inferior, while conversely if large, the low heat build-up property and abrasion resistance are inferior.

If the toluene swelling index of the conjugated diene-based rubber gel (B) is small, the mooney's viscosity of a rubber composition, in which a reinforcing material is blended, is increased and the processability is decreased, the elongation of the vulcanizate is decreased, or the abrasion resistance is decreased. Further, conversely, if the index is large, the wet grip is inferior.

The toluene swelling index in the conjugated diene-based rubber gel (B) is calculated from the weight of the gel at the time of toluene swelling and the weight when dry as (weight of gel at time of toluene swelling)/(weight when dry). Specifically, it is measured as follows:

250 mg of conjugated diene-based rubber gel (B) is shaken for 24 hours in 25 ml of toluene to cause the swelling. The swelled gel is centrifuged by a centrifugal separator under conditions of a centrifugal force of at least 400,000 m/sec$^2$, the swelled gel is weighed at the wet state, then the gel is dried at 70° C., until reaching a constant weight and the dried gel is again weighed. The toluene swelling index is measured by calculating the value of (gel weight in wet state)/(weight of dried gel) from the measured values.

Specific examples of the conjugated diene monomer, are 1,3-butadiene, 2-methyl-1,3-butadiene, 1,3-pentadiene, 2-chloro-1,3-butadiene, etc. Among these, 1,3-butadiene and 2-methyl-1,3-butadiene are preferable and 1,3-butadiene is more preferable. These conjugated diene monomers may be used alone or in any mixtures of two or more types.

The above aromatic vinyl monomer is an aromatic monovinyl compound. Specific examples thereof are styrene, o-methylstyrene, m-methylstyrene, p-methylstyrene, 2,4-dimethylstyrene, o-ethylstyrene, m-ethylstyrene, p-ethylstyrene, p-tert-butylstyrene, α-methylstyrene, α-methyl-p-methylstyrene, o-chlorostyrene, m-chlorostyrene, p-chlorostyrene, p-bromostyrene, 2-methyl-4,6-dichlorostyrene, 2,4-dibromostyrene, vinylnaphthalene, etc. These may be used alone or in any mixtures thereof. Among these, styrene is preferably used.

In the present invention, to efficiently form the gel structure, it is preferable to use a polyfunctional monomer having a cross-linking action. Examples of such a polyfunctional monomer are those having a carbon-carbon double bond capable of copolymerizing with at least two, preferably two to four, conjugated diene monomers. Specific examples thereof are a polyhydric vinyl aromatic compound such as diisopropenylbenzene or divinylbenzene; an unsaturated ester compound of an α,β-ethylenic unsaturated carboxylic acid such as vinyl acrylate, vinyl methacrylate, and allyl methacrylate; an unsaturated ester compound of a polyhydric carboxylic acid such as diallyl phthalate, triallyl cyanurate, triallyl isocyanurate, and triallyl trimellitate; an unsaturated ester compound of a polyhydric alcohol such as ethyleneglycol diacrylate, ethyleneglycol dimethacrylate, and propyleneglycol dimethacrylate; 1,2-polybutadiene, divinylether, divinylsulfone, N,N'-m-phenylene maleimide, etc. These may be used alone or in any mixtures thereof.

Further, an unsaturated polyester compound produced from an aliphatic or aromatic diol such as ethyleneglycol, propyleneglycol, butanediol, hexanediol, neopentylglycol, or bisphenol A; a polyethyleneglycol having 2 to 20, preferably 2 to 8 oxyethylene units; a polyol such as glycerol, trimethylolpropane, pentaerythritol, and sorbitol; and other polyhydric alcohols and an unsaturated polyhydric carboxylic acid such as maleic acid, fumaric acid, and itaconic acid may be mentioned. These polyfunctional monomers may be used alone or in any mixtures thereof. Among these, divinylbenzene is preferable. Divinylbenzene includes an ortho-, meta-, and para-form. These may be used alone or in any mixtures thereof.

A polyfunctional monomer having this cross-linking action is used mainly to cause generation of a gel structure inside the conjugated diene-based rubber particles at the time of the polymerization reaction and suitably adjust the toluene swelling index of the conjugated diene-based rubber gel (B). Normally, it is used in an amount of about 1.5% by weight or less based upon 100% by weight of the total monomers, preferably 0.1 to 1% by weight, more preferably 0.1 to 0.5% by weight, particularly preferably 0.2 to 0.4% by weight.

The conjugated diene-based rubber gel (B) compounded in the present invention may also contain other monomer units within a range not impairing the effects of the present invention, in addition to the above conjugated diene monomer units, aromatic vinyl monomer units, and polyfunctional monomer units. The content of the other monomers in the conjugated diene-based rubber gel (B) is preferably not more than 20% by weight, more preferably not more than 5% by weight, particularly preferably not more than 1% by weight.

The other monomers capable of being used in the present invention are not particularly limited so long as they are monomers which can copolymerize with the conjugated diene monomers and aromatic vinyl monomers. The specific examples are α,β-ethylenically unsaturated carboxylic acid ester monomers, α,β-ethylenically unsaturated nitrile monomers, α,β-ethylenic unsaturated carboxylic acid monomers, α,β-ethylenic unsaturated carboxylic acid amide monomers, and olefin monomers etc. Among these, α,β-ethylenically unsaturated carboxylic acid ester monomers and α,β-ethylenically unsaturated nitrile monomers are preferred.

The α,β-ethylenic unsaturated carboxylic acid ester monomers include, for example, alkyl esters such as methyl acrylate, methyl methacrylate, ethyl acrylate, butyl acrylate, 2-ethylhexyl acrylate, and lauryl methacrylate; alkoxy substituted alkyl esters such as methoxyethyl acrylate and ethoxyethyl acrylate; cyano substituted alkyl esters such as cyanomethyl acrylate, 2-cyanoethyl acrylate, and 2-ethyl-6-cyanohexyl acrylate; hydroxy substituted alkyl esters such as 2-hydroxyethyl acrylate and 2-hydroxyethyl methacrylate; epoxy substituted alkyl esters such as glycidyl acrylate and glycidyl methacrylate; amino substituted alkyl esters such as N,N-dimethylaminoethyl acrylate; halogen substituted alkyl esters such as 1,1,1-trifluoroethyl acrylate; polyhydric carboxylic acid fully substituted alkyl esters such as maleic acid diethyl esters, fumaric acid dibutyl esters, and itaconic acid dibutyl esters; etc. Among these, methyl methacrylate is preferably used.

Specific examples of α,β-ethylenically unsaturated nitrile monomers are acrylonitrile, methacrylonitrile, etc. Among these, acrylonitrile is preferably used.

Specific examples of α,β-ethylenically unsaturated carboxylic acid monomers are monocarboxylic acids such as acrylic acid and methacrylic acid; polyhydric carboxylic acids such as maleic acid, fumaric acid, and itaconic acid; and partial alkyl esters of polyhydric carboxylic acids such as fumaric acid monobutyl esters, maleic acid monobutyl esters, and itaconic acid monoethyl esters.

Specific examples of α,β-ethylenically unsaturated carboxylic acid amide monomers are, for example, acrylamide, methacrylamide, N,N-dimethylacrylamide, N-butoxymethylacrylamide, N-butoxymethylmethacrylamide, N-methylolacrylamide, N,N-dimethylolacrylamide, etc.

The olefin monomers are, preferably chain or cyclic monoolefin compounds containing 2 to 10 carbon atoms, for example, ethylene, propylene, 1-butene, cyclopentene, and 2-norbornene.

In addition to the above essential constituents, according to the present invention, it is also possible to use the other monomers such as vinyl chloride, vinylidene chloride, vinyl pyridine. These may be used alone or may be used in any mixtures of two or more types.

When producing a conjugated diene-based rubber gel (B) using polyfunctional monomers and other monomers as optional ingredients, the conjugated diene-based rubber gel (B) is composed of 40 to 75% by weight of the conjugated diene monomer units, preferably 45 to 65% by weight, more preferably 50 to 60% by weight, 60 to 25% by weight of aromatic vinyl monomer units, preferably 55 to 35% by weight, more preferably 50 to 40% by weight, 0 to 1.5% by weight of polyfunctional monomer units, preferably 0 to 0.5% by weight, more preferably 0 to 0.4% by weight, and 0 to 20% by weight of other monomer units, preferably 0 to 5% by weight, more preferably 0 to 1% by weight.

When the conjugated diene-based rubber gel (B) using polyfunctional monomers as essential ingredients is produced, the conjugated diene-based rubber gel (B) is composed of 40 to 74.9% by weight of conjugated diene monomer units, preferably 45 to 64.9% by weight, more preferably 50 to 59.8% by weight, 58.5 to 25% by weight of aroamtic vinyl monomer units, preferably 54.5 to 35% by weight, more preferably 49.6 to 40% by weight, 0.1 to 1.5% by weight of polyfunctional monomer units, preferably 0.1 to 0.5% by weight, more preferably 0.2 to 0.4% by weight, and 0 to 20% by weight of other monomer units, preferably 0 to 5% by weight, more preferably 0 to 1% by weight.

The particle size of the conjugated diene-based rubber gel (B) to be mixed in the present invention is preferably 5 to 1000 nm, more preferably 20 to 400 nm, particularly preferably 50 to 200 nm. The particle size is the weight average particle size obtained by dyeing and immobilizing the conjugated diene-based rubber gel (B) by osmium tetrachloride etc., then observing it through a transmission type electron microscope and measuring the diameters of about 100 rubber gel particles.

The conjugated diene-based rubber gel (B) compounded in the present invention is not particularly limited, but may be directly produced by emulsion polymerization or may be produced by causing diene-based rubber latex particles not having a gel structure produced by emulsion polymerization to cross-link followed by a compound having a cross-linking action. Further, it may also be produced-by causing an emulsion obtained by emulsifying an organic solvent solution of a rubber polymer obtained by solution polymerization in water in the presence of an emulsifier to later cross-link by a compound having a cross-linking action before or after removing the organic solvent.

In this emulsion polymerization, conjugated diene-based rubber latex particles having a gel structure are directly obtained by the copolymerization with a polyfunctional monomer having a cross-linking action. Further, a conjugated diene-based rubber latex having conjugated diene monomer units gains a gel structure in the latex particles by continuing a polymerization reaction until a high conversion rate, for example, a conversion rate of more than 90% by weight.

When a conjugated diene-based rubber gel (B) is directly produced by emulsion polymerization in this way, it is sufficient to adjust the amount of use of the polyfunctional monomer having the cross-linking action, the amount of use of the chain transfer agent, conversion rate at the time of terminating the polymerization, etc. so that the toluene swelling index becomes a desired index.

The monomer composition in emulsion polymerization is composed of a conjugated diene monomer in an amount of preferably 38 to 65% by weight, more preferably 40 to 55% by weight, particularly preferably 42 to 52% by weight, aromatic vinyl monomer in an amount of preferably 62 to 35% by weight, more preferably 60 to 45% by weight, particularly preferably 58 to 48% by weight, polyfunctional monomer in an amount of preferably 0 to 1% by weight, more preferably 0 to 0.5% by weight, particularly preferably 0 to 0.4% by weight, and other monomer in an amount of preferably 0 to 20% by weight, more preferably 0 to 5% by weight, particularly preferably 0 to 1% by weight.

In emulsion polymerization, the monomer composition when using the polyfunctional monomer as an essential ingredient is composed of a conjugated diene monomer in an amount of preferably 38 to 64.9% by weight, more preferably 40 to 54.9% by weight, particularly preferably 42 to 51.8% by weight, aromatic vinyl monomer in an amount of preferably 61 to 35% by weight, more preferably 59.5 to 45% by weight, particularly preferably 57.6 to 48% by weight, polyfunctional monomer in an amount of preferably 0.1 to 1% by weight, more preferably 0.1 to 0.5% by weight, particularly preferably 0.2 to 0.4% by weight, and another monomer in an amount of preferably 0 to 20% by weight, more preferably 0 to 5% by weight, particularly preferably 0 to 1% by weight.

Such emulsion polymerization is not particularly limited. It is possible to use any emulsifier, polymerization initiator, chain transfer agent, polymerization terminator, anti-aging agent, etc. used in emulsion polymerization in the past. Further, the emulsion polymerization technique is also not particularly limited. It is possible to use a conventional technique.

The above-mentioned emulsifier is not particularly limited, but it is possible to exemplify a fatty acid soap, rosin soap, etc. Specifically, the fatty acid soap is selected from a sodium salt or potassium salt of a $C_{12}$ to $C_{18}$ long chain aliphatic carboxylic acid such as lauric acid, myristic acid, palmitic acid, stearic acid, oleic acid, or mixed fatty acid carboxylic acids of the same. Further, the rosin soap may be selected from natural rosins such as a sodium salt or potassium salt of disproportionated or hydrated gum rosin, wood rosin, tall oil rosin. The amount of use of the emulsifier is also not particularly limited, but usually is 0.05 to 10 parts by weight, more preferably 0.5 to 5 parts by weight, based upon 100 parts by weight of the monomer.

The polymerization initiator include, for example, hydrogen peroxide, an organic peroxide, persulfate, organic azo compound, a redox type polymerization initiator composed of these compounds and ferric sulfate) and sodium formaldehydesulfoxylate etc. Examples of the organic peroxide are dicumyl peroxide, t-butylcumyl oxide, bis-(t-butyl-peroxy-isopropyl)benzene, di-t-butyl peroxide, benzoyl peroxide, 2,4-dichlorobenzoyl peroxide, t-butyl perbenzoate, etc. The persulfate, ammonium persulfate, sodium persulfate, potassium persulfate, etc. are included. Examples of the organic azo compound are azobisisobutyronitrile and azobiscyclohexanenitrile, etc.

The amount of the polymerization initiator used is normally about 0.001 to 1 part by weight, based upon 100 parts by weight of the monomer. It is sufficient to suitably adjust the to obtain the desired reaction speed etc. at a desired reaction temperature.

Examples of the chain transfer agent are, for example, 2,4,4-trimethyl-pentane-2-thiol, 2,2,-4,6,6-pentamethyl-heptane-4-thiol, 2,2,4,6,6,8,8-heptamethyl-nonane-4-thiol, t-dodecylmercaptan, t-tetradecylmercaptane, and other mercaptans; xanthogendisulfides such as dimethylxanthogen disulfide, diethylxanthogen disulfide, and diisopropylxanthogen disulfide; thiuram disulfides such as tetramethylthiuram disulfide, tetraethylthiuram disulfide, and tetrabutylthiuram disulfide; halogenated hydrocarbons such as carbon tetrachloride and ethylene bromide; hydrocarbons such as pentaphenylethane; and sylthioglycolate, terpinolene, α-terpinene, γ-terpinene, dipentene, an α-methylmethylene dimer (those containing at least 50% by weight of 2,4-diphenyl-4-methyl-1-pentene are preferred), 2,5-dihydrofuran, etc. These chain transfer agents may be used alone or in any mixtures of two or more types. The amount of the chain transfer agent used is not particularly limited. Usually, it is not more than 3 parts by weight based upon 100 parts by weight of the monomer mixture, preferably 0.05 to 1 part by weight, more preferably 0.1 to 0.6 part by weight.

The polymerization terminator is not particularly limited, but the conventionally ordinarily used polymerization terminators having an amine structure such as hydroxylamine, sodium dimethyldithiocarbamate, diethylhydroxyamine, and hydroxyamine sulfonic acid and its alkali metal salts; polymerization terminators not having amine structures such as hydroxydimethylbenzenedithiocarboxylic acids, hydroxydiethylbenzenedithiocarboxylic acids, hydroxydibutylbenzenedithiocarboxylic acids, and other aromatic hydroxydithiocarboxylic acids and their alkali metal salts; hydroquinone derivatives, catechol derivatives, etc. may be mentioned. These polymerization terminators may be used alone or in any mixtures of two or more types. The amount of the polymerization terminator used is also not particularly limited, but normally is 0.1 to 10 parts by weight, based upon 100 parts by weight of the monomers.

Examples of the anti-aging agent are, for example, hindered phenol compounds such as 2,6-di-tert-butyl-4-methylphenol and 2,6-di-tert-butyl-4-ethylphenol; hindered amine compounds such as diphenyl-p-phenylenediamine and N-isopropyl-N'-phenyl-p-phenylenediamine; etc. The amount of the anti-aging agent used is also not particularly limited, but is usually 0.05 to 5 parts by weight or so, based upon 100 parts by weight of the polymer produced by the emulsion polymerization.

The ratio between the monomer and water (i.e., weight ratio of monomer/water) at the time of emulsion polymerization is also not particularly limited, but is usually 5/95 to 50/50, preferably 10/90 to 40/60, more preferably 20/80 to 35/65.

The polymerization temperature is not particularly limited either, but is usually −5 to 80° C., preferably 0 to 60° C., more preferably 3 to 30° C., particularly preferably 5 to 15° C. If the polymerization temperature is low, the economicalness and productivity are inferior, while if high, the abrasion resistance and low heat build-up property of the cross-linked rubber tend to become inferior.

When causing emulsion polymerization of a polyfunctional monomer having a cross-linking action to produce the diene-based rubber gel (B), the conversion rate at the time of terminating the polymerization reaction is preferably 50 to 90%, more preferably 60 to 85%, particularly preferably 65 to 80%. If the conversion rate is low, the productivity is inferior, while if high, the abrasion resistance and low heat build-up property of the cross-linked rubber tend to become inferior.

When a conjugated diene-based rubber gel (B) is directly produced by emulsion polymerization, the polymerization is performed by an ordinary emulsion polymerization technique and the polymerization reaction is terminated by adding a polymerization terminator when a predetermined conversion rate is reached. Next, as desired, an anti-aging agent is added, then the remaining monomer is removed by heating, steam distillation, etc., then a coagulant used in ordinary emulsion polymerization such as calcium chloride, sodium chloride, aluminum sulfate, or other coagulant comprised of an inorganic salt, a polymer coagulant, or a heat sensitive coagulant is added to coagulate and recover the latex. The recovered latex is washed with water and dried to obtain the desired conjugated diene-based rubber gel (B). At the time of coagulation, it is possible to obtain an oil-extended product by adding an extender oil.

As the compound having a cross-linking action used when later causing the diene-based rubber latex to cross-link, for example, an organic peroxide such as dicumyl peroxide, t-butylcumyl peroxide, bis-(t-butyl-peroxy-isopropyl) benzene, di-t-butyl peroxide, benzoyl peroxide, 2,4-dichlorobenzoyl peroxide, and t-butyl perbenzoate; an organic azo compound such as azobisisobutyronitrile and azobiscyclohexanenitrile; a dimercapto compound or polymercapto compound such as dimercaptoethane, 1,6-dimercaptohexane, and 1,3,5-trimercaptotriazine; etc. may be mentioned. Among these, an organic peroxide is preferably used.

The reaction conditions at the time of cross-linking depend on the reactivity and amount of addition of the compound having the cross-linking action, but it is possible to suitably select a reaction pressure of ordinary pressure to high pressure (e.g., about 1 MPa), a reaction temperature of room temperature to about 170° C., and a reaction time of 1 minute to about 24 hours.

The type of the compound having the cross-linking action, the amount of its addition, the reaction conditions, etc. are adjusted to obtain the desired toluene swelling index.

The method of copolymerizing a polyfunctional monomer having a cross-linking action in emulsion polymerization, the method of continuing the polymerization reaction until a high conversion rate, and the method of later cross-linking by a compound having a cross-linking action may be employed alone or may be employed in combination. In particular, the method of copolymerizing a polyfunctional monomer in emulsion polymerization is preferable in that remainder of a compound having a cross-linking action is avoided, the productivity is superior, and the abrasion resistance and wet grip are more superior.

Before coagulating the latex comprising the conjugated diene-based rubber gel (B), it is possible as desired to mix in a rubber latex substantially not having a gel structure or a rubber gel latex other than the conjugated diene-based rubber gel (B). The rubber composition obtained by coagulating, recovering, and drying this latex mixture contains a predetermined amount of the conjugated diene-based rubber gel (B).

The rubber composition according to the present invention comprises (A) the sulfur cross-linkable rubber and (B) the conjugated diene-based rubber gel. The ratio of the sulfur cross-linkable rubber (A) and the conjugated diene-based rubber gel (B) is a ratio (weight ratio) of (A)/(B) of preferably 99/1 to 50/50, more preferably 90/10 to 50/50, particularly preferably 85/15 to 60/40. If the ratio of the conjugated diene-based rubber gel (B) in the rubber composition of the present invention is small, the wet grip is inferior, while if it is large, the elongation of the vulcanizate is decreased or the low heat build-up property tends to be inferior.

The rubber composition according to the present invention can include a reinforcing material and, optionally, other compounding agents. As the reinforcing material, carbon black, silica, etc. is preferably compounded.

Examples of the carbon black compounded into the rubber composition according to the present invention are, for example, furnace black, acetylene black, thermal black, channel black, graphite, and any other carbon black compounded into rubber compositions in the past may be used. Among these, it is preferable to use furnace black from the viewpoint of the high reinforcing ability. As specific examples, SAF, ISAF, ISAF-HS, ISAF-LS, IISAF-HS, HAF, HAF-HS, HAF-LS, FEF, and other grades may be mentioned. These carbon blacks can be used alone or in combinations of two or more types.

The specific surface area of the carbon black is not particularly limited, but the lower limit of the nitrogen specific surface area ($N_2SA$) is preferably 5 $m^2/g$, more preferably 80 $m^2/g$, particularly preferably 90 $m^2/g$, while the upper limit is preferably 200 $m^2/g$, more preferably 180 $m^2/g$, particularly preferably 130 $m^2/g$. If the nitrogen specific area is in this range, the mechanical properties and abrasion resistance are superior.

Further, the dibutyl phthalate (DBP) oil absorption of the carbon black is also not particularly limited, but the lower limit is preferably 5 ml/100 g, more preferably 80 ml/100 g, particularly preferably 100 ml/100 g, while the upper limit is preferably 300 ml/100 g, more preferably 160 ml/100 g, particularly preferably 150 ml/100 g. If the DBP absorption is in this range, the mechanical properties and abrasion resistance are superior.

Further, as the carbon black, if high structure carbon black is used, as disclosed in Japanese Unexamined Patent Publication (Kokai) No. 5-230290 having a specific surface area of absorption of cetyltrimethyl ammonium bromide (CTAB) of 110 to 170 $m^2/g$ and a DBP (24M4DBP) oil absorption after repeated compression at a pressure of 24,000 psi four times of 110 to 130 ml/100 g, the abrasion resistance is superior.

The silica usable in the present invention is not particularly limited, but it is possible to use dry white carbon, wet white carbon, colloidal silica, precipitated silica as disclosed in Japanese Unexamined Patent Publication (Kokai) No. 62-62838, and any other silica used for rubber compositions in the past. Among these, wet white carbon (i.e., wet silica) mainly composed of hydrous silicic acid is preferable. These silicas may be used alone or in combinations of two or more types.

The specific surface area of the silica is not particularly limited, but the lower limit of the nitrogen specific surface area (i.e., BET method) is preferably 50 $m^2/g$, more preferably 100 $m^2/g$, particularly preferably 120 $m^2/g$, while the upper limit is preferably 400 $m^2/g$, more preferably 220 $m^2/g$, particularly preferably 190 $m^2/g$. If the nitrogen specific area is within this range, the mechanical properties and abrasion resistance area superior. Note that the nitrogen specific surface area is the value measured by the BET method in accordance with ASTM D3037-81.

The pH of the silica is preferably acidic, that is, less than pH 7.0, more preferably is a pH of 5.0 to 6.9.

When the rubber composition of the present invention contains silica as a reinforcing material, if a silane coupling agent is added, the low heat build-up property and the abrasion resistance are further improved. This silane coupling agent is not particularly limited, but vinyl triethoxysilane, β-(3,4-epoxycyclohexyl)ethyltrimethoxysilane, N-(β-aminoethyl)-γ-aminopropyltrimethoxysilane, bis (3-(triethoxysilyl)propyl)tetrasulfide, bis(3-(triethoxysilyl) propyl)disulfide, etc. or a tetrasulfide such as γ-trimethoxysilylpropyldimethylthiocarbamyl tetrasulfide or γ-trimethoxysilylpropylbenzothiazyl tetrasulfide described in Japanese Unexamined Patent Publication (Kokai) No. 6-248116 may be mentioned. As the silane coupling agent, one including not more than four sulfur atoms in its molecule is preferable since scorching at the time of mixing is avoided.

These silane coupling agents may be used alone or in any mixtures of two or more types. The lower limit of the amount of silane coupling agent compounded into 100 parts by weight of silica is preferably 0.1 part by weight, more preferably 1 part by weight, particularly preferably 2 parts by weight, while the upper limit is preferably 30 parts by weight, more preferably 20 parts by weight, particularly preferably 10 parts by weight.

The lower limit of the amount of reinforcing material compounded is preferably 10 parts by weight, based upon 100 parts by weight of the total of the sulfur cross-linkable rubber (A) and conjugated diene-based rubber gel (B) (i.e., total rubber ingredients), more preferably 20 parts by weight, particularly preferably 30 parts by weight, while the upper limit is preferably 200 parts by weight, more preferably 150 parts by weight, particularly preferably 100 parts by weight.

When carbon black is used alone, or carbon black and silica are used in combination, as the reinforcing material, the silica is preferably compounded in an amount of 0 to 80 parts by weight, based upon 100 parts by weight of the total rubber ingredients, more preferably 10 to 75 parts by weight, and the carbon black in an amount of preferably 10 to 90 parts by weight, more preferably 15 to 85 parts by weight.

When silica and carbon black are used together as reinforcing materials in the rubber composition of the present invention, the ratio of mixture is not particularly limited, but can be suitably selected in accordance with the application or object, but a weight ratio of silica:carbon black of 10:90 to 99:1 is preferable, 20:80 to 95:5 is more preferable, and 30:70 to 90:10 is particularly preferable.

One preferable embodiment of use of the rubber composition according to the present invention as a rubber composition for a tire tread is configured as follows:

The rubber composition for a tire tread contains 50 to 90 parts by weight of the sulfur cross-linkable rubber (A), preferably 60 to 85 parts by weight, and 50 to 10 parts by weight of the conjugated diene-based rubber gel (B), preferably 40 to 15 parts by weight and, further, in addition to the sulfur cross-linkable rubber (A) and conjugated diene-based rubber gel (B), includes, based upon 100 parts by weight of the total of these components, wet silica in an amount of preferably 0 to 80 parts by weight, more preferably 10 to 75 parts by weight, and carbon black having an $N_2SA$ (measured according to JIS K 6217) of preferably 80 to 200 $m^2/g$, more preferably 90 to 180 $m^2/g$, and a DBP oil absorption (measured based on JIS K 6221 Oil Absorption Method A) of preferably 80 to 160 ml/100 g, more preferably 100 to 150 ml/100 g, in an amount of preferably 10 to 90 parts by weight, more preferably 15 to 85 parts by weight.

The wet silica compounded into the rubber composition for a tire tread may be optionally made any wet silica compounded for tire tread use in the past. The compounding of the wet silica can further improve the wet performance.

The carbon black compounded into the rubber composition for a tire tread, when having the above specific $N_2SA$ and DBP oil absorption, is superior in the balance of physical properties and processability and gives a suitable electrical resistance to the tire, so problems due to static electricity occurred in a car do not occur so easily.

The rubber composition of the present invention may have compounded into it, in addition to the above essential ingredients, a cross-linking agent, cross-linking accelerator, cross-linking activator, anti-aging agent, activator, process oil, plasticizer, lubricant, filler, and other compounding agents other than reinforcing materials in necessary amounts by an ordinary method.

The cross-linking agent is not particularly limited, but sulfur such as powdered sulfur, precipitated sulfur, colloidal sulfur, insoluble sulfur, and high dispersion sulfur; halogenated sulfur such as sulfur monochloride and sulfur dichloride; organic peroxides such as dicumyl peroxide, and ditertiary butyl peroxide; quinone dioximes such as p-quinone dioxime and p,p'-dibenzoylquinone dioxime; organic polyhydric amine compounds such as triethylene tetramine, hexamethylenediamine carbamate, and 4,4'-methylene bis-o-chloroaniline; alkylphenol resins having methylol groups; etc. may be mentioned. Among these, sulfur is preferable and powdered sulfur is particularly preferable. These cross-linking agents may be used alone or in combinations of two or more types.

The lower limit of the amount of the cross-linking agent blended into 100 parts by weight of the total rubber ingredients is preferably 0.1 part by weight, more preferably 0.3 part by weight, particularly preferably 0.5 part by weight, while the upper limit is preferably 15 part by weight, more preferably 10 parts by weight, particularly preferably 5 parts by weight. If the amount of the cross-linking agent compounded is in this range, the low heat build-up property and abrasion resistance are superior.

Examples of the cross-linking accelerator are, for example, a sulfenamide-based cross-linking accelerator such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; a guanidine-based cross-linking accelerator such as diphenylguanidine, di-o-tolylguanidine, and o-tolylbiguanidine; a thiourea-based cross-linking accelerator such as diethylthiourea; a thiazole-based cross-linking accelerator such as 2-mercaptobenzothiazole, dibenzothiazyldisulfide and 2-mercaptobenzothiazole zinc salt; a thiuram-based cross-linking accelerator such as tetramethylthiuram monosulfide and tetramethylthiuram disulfide; a dithiocarbamic acid-based cross-linking accelerator such as sodium dimethyldithiocarbamate and zinc diethyldithiocarbamate; a xanthogenic acid-based cross-linking accelerator such as isopropyl xanthogenate and zinc butyl xanthogenate; and other cross-linking accelerators.

These cross-linking accelerators may be used alone or in combinations of two or more types, but one including a sulfenamide-based cross-linking accelerator is particularly preferable. The lower limit of the amount of the cross-linking accelerator compounded in 100 parts by weight of the total rubber ingredients is preferably 0.1 part by weight, more preferably 0.3 part by weight, particularly preferably 0.5 part by weight, while the upper limit is preferably 15 parts by weight, more preferably 10 parts by weight, particularly preferably 5 parts by weight.

The cross-linking activator is not particularly limited, but higher fatty acid such as stearic acid or zinc oxide etc. may be used. As the zinc oxide, one having a high surface activity and a particle size of not more than 5 $\mu$m is preferably used. Activated zinc white having a particle size of 0.05 to 0.2 $\mu$m or less or zinc white of 0.3 to 1 $\mu$m may be mentioned. Further, the zinc white used may be one surface treated with an amine-based dispersant or wetting agent.

These cross-linking activators may be used alone or in any combinations of two or more types. The rate of blending of the cross-linking activator is suitably selected according to the type of the cross-linking activator. The lower limit of the amount of addition of the higher fatty acid to 100 parts by weight of the total rubber ingredients is preferably 0.05 part by weight, more preferably 0.1 part by weight, particularly preferably 5 parts by weight, while the upper limit is preferably 15 parts by weight, more preferably 10 parts by weight, particularly preferably 5 parts by weight. The lower limit of the amount of addition of the zinc white to 100 parts by weight of the total rubber ingredients is preferably 0.05 part by weight, more preferably 0.1 part by weight, particularly preferably 0.5 part by weight, while the upper limit is preferably 10 parts by weight, more preferably 5 parts by weight, particularly preferably 2 parts by weight. If the amount of the cross-linking activator compounded is in this range, the processability, mechanical properties, abrasion resistance, etc. of the unvulcanized rubber composition are superior, and therefore, this is preferred.

Further, as the additives which can be used in the present invention, for example, activators such as diethyleneglycol, polyethyleneglycol, and silicone oil; fillers such as calcium carbonate, talc, and clay, waxes, etc. may be mentioned.

The rubber composition of the present invention may include other rubber other than the sulfur cross-linkable rubber (A) and the conjugated diene-based rubber gel (B) in a range not impairing the effects of the present invention. Examples of the other rubber, acryl rubber, epichlorohydrin rubber, fluororubber, silicone rubber, ethylene-propylene rubber, urethane rubber, etc.

The rubber composition of the present invention can be obtained by mixing the ingredients according to an ordinary method. For example, it is possible to mix the compounding agents other than the cross-linking agent and cross-linking accelerator with the rubber ingredients, then the cross-linking agent and cross-linking accelerator are mixed to the mixture to obtain the rubber composition. The lower limit of the mixing temperature of the compounding agents other than the cross-linking agent and cross-linking accelerator and the rubber ingredients is preferably 80° C., more preferably 100° C., particularly preferably 140° C., while the upper limit is preferably 200° C., more preferably 190° C., particularly preferably 180° C. The lower limit of the mixing time of the compounding agents other than the cross-linking agent and the cross-linking accelerator and the rubber ingredient is preferably 30 seconds, more preferably 1 minute, while the upper limit is preferably 30 minutes.

The cross-linking agent and the cross-linking accelerator are mixed after cooling the temperature of the rubber formulation to usually not more than 100° C., preferably not more than 80° C.

The rubber composition of the present invention is normally cross-linked when used. The cross-linking method is not particularly limited and may be suitably selected depending upon the shape, size, etc. of the cross-linked article. It is possible to fill a cross-linkable rubber composition into a mold and then heat it to cross-link it simultaneously with molding or to heat and cross-link an uncross-linked rubber composition molded in advance.

The cross-linking temperature is preferably 120 to 200° C., more preferably 140 to 180° C., while the cross-linking time is normally about 1 to 120 minutes.

The cross-linked rubber of the present invention can be used, for example, as a part of a tire, cable sheath, hose, transmission belt, conveyor belt, roll cover, shoe soles, sealing rings, and rubber vibration absorbers. In particular, it can be suitably used for making a tire tread.

The conjugated diene-based rubber gel (B) to be compounded into the rubber composition according to the present invention may be mixed with other rubber, in addition to the conjugated diene-based rubber gel (B) in advance. The other rubber is preferably a rubber selected from the above sulfur cross-linkable rubbers (A), more preferably is a rubber capable of taking a latex state. In the case of a rubber in a latex state, by mixing the latex of the conjugated diene-based rubber gel (B) and the latex of that rubber in any proportion before coagulation and then co-coagulating them, a rubber mixture containing the conjugated diene-based rubber gel (B) is easily obtained. When used as a rubber mixture, the conjugated diene-based rubber gel (B) is preferably contained in an amount of at least 30% by weight, more preferably at least 50% by weight, particularly preferably at least 60% by weight.

By compounding a rubber mixture containing this conjugated diene-based rubber gel (B) into the sulfur cross-linkable rubber (A) to give a desired ratio of the amount of the conjugated diene-based rubber gel (B) in the rubber composition, a rubber composition improved in wet grip is obtained.

When a rubber mixture containing this conjugated diene-based rubber gel (B) and a conjugated diene-based rubber gel (B) is mixed in a rubber composition, it acts effectively as a material improving the wet grip.

EXAMPLES

The present invention will now be explained in further detail with reference to Examples, but the scope of the present invention is of course not limited to these Examples. Note that in the production Examples, Examples, and Comparative Examples, the "parts" and "%" are based on weight unless otherwise indicated.

The properties of the starting rubber ingredients and the rubber compositions were measured as follows:

(1) Particle size of rubber gel particles: A latex of a conjugated diene-based rubber gel diluted with water to give a solid concentration of 0.01% or so was dropped on a mesh for observation by a transmission type electron microscope, then was dyed and immobilized by osmium tetrachloride vapor, then the moisture was evaporated to obtain the sample for observation. The observation sample was observed under a transmission type electron microscope at a magnification of 20,000 to 50,000X, the diameters of 100 particles (unit: nm) were measured, then the weight average particle size was found from those values.

(2) Amount of styrene units: The amount of styrene units bonded in the copolymer was measured according to JIS K 6383. However, in a copolymer obtained by copolymerization of divinylbenzene bonded divinylbenzene units are also included in the amount of styrene units measured.

(3) Toluene swelling index: 250 mg of the sample rubber is shaken for 24 hours in 25 ml of toluene to cause it to swell. The swelled gel is centrifuged by a centrifugal separator under conditions of a centrifugal force of 430,000 m/sec$^2$ the swelled gel is weighed in the wet state, then the gel is dried at 70° C. until reaching a constant weight and the dried gel is again weighed. The toluene swelling index is measured by calculating the (gel weight in wet state)/(weight of dried gel) from these measured values.

(4) Mooney viscosity: The Mooney's viscosity ($ML_{1+4}$, 100° C.) of the starting rubber was measured based on JIS K 6300.

(5) Mechanical properties of cross-linked rubber: The tensile strength and elongation of the cross-linked rubber were measured based on JIS K 6301.

(6) Abrasion resistance index: A pico abrasion test was conducted based on JIS K 6264 and the results indicated by an index using Comparative Example 1 or 4 as 100. The larger the abrasion resistance index, the better the abrasion resistance.

(7) tan $\delta$ (0° C.)/tan $\delta$ (60° C.) index: Using an RDA-II made by Rheomatrix, the tan $\delta$ at 0° C. and 60° C. were measured under conditions of 0.5% torsion and 20 Hz in order to find the tan $\delta$ (0° C.)/tan $\delta$ (60° C.) value. If the tan $\delta$ (0° C.) is large, the wet grip is superior, while if the tans (60° C.) is small, the low heat build-up property is superior, and therefore, if the value of the tan $\delta$ (0° C.)/tan $\delta$ (60° C.) is large, the wet grip is better for the same low heat build-up property. Note that the results are shown by an index against Comparative Example 1 or 4 as 100. The larger this index, the better the wet grip shown.

Production Example 1

Production of Conjugated Diene-Based Rubber Gel I 200 parts of water, a total of 4.5 parts of disproportionated potassium rosinate and a sodium fatty acid as an emulsifier, 0.1 part of potassium chloride, and the monomer mixture and chain transfer agent (i.e., t-dodecylmercaptan) shown in Table 1 were charged into a pressure vessel. The internal temperature was set to 10° C. while stirring, then 0.1 part of cumen hydroperoxide, 0.2 part of sodium formaldehydesulfoxylate, and 0.01 part of ferric sulfate were added as radical polymerization initiators to start the polymerization reaction.

The reaction was continued at 10° C. until reaching a polymer conversion rate of 70%, then 0.1 part of diethyl-hydroxylamine was added to terminate the polymerization. Part of the latex was sampled after the end of polymerization, then the amounts of unreacted monomers were found, based on calibration curves prepared in advance by gas chromatography analysis. The amounts of monomer units forming the copolymer were determined from the amounts of unreacted monomers found above and the amounts of monomers charged. The results are shown in Table 1.

Next, the sample was warmed and the residual monomers recovered by steam distillation under reduced pressure at about 70° C., then the equivalent of 2 parts of an anti-aging agent (i.e., 2,6-di-tert-butyl-4-methylphenol) was added to 100 parts of the produced copolymer. Part of the latex obtained was taken and measured for weight average particle size. The results are shown in Table 1.

Next, the latex obtained was added to a sodium chloride/sulfuric acid solution to coagulate it. The produced crumbs were taken out, washed sufficiently by water, then dried at 50° C. under reduced pressure to obtain the conjugated diene-based rubber gel I. The amount of styrene units and toluene swelling index of the conjugated diene-based rubber gel I are shown in Table 1.

Production Examples 2 to 5

The same procedure was followed as in Production Example 1 using monomer mixtures of the compositions shown in Table 1 to obtain the conjugated diene-based rubber gels II to V. The properties thereof are shown in Table 1.

Production Example 6

The same procedure was followed as in Production Example 1, except for using a monomer mixture of the composition shown in Table 1 and changing the reaction temperature to 50° C. and the radical polymerization initiator to 0.2 part of potassium persulfate, to obtain the conjugated diene-based rubber gel VI. The properties thereof are shown in Table 1.

Production Example 7

The same procedure was followed as in Production Example 6, except for using a monomer mixture of the composition shown in Table 1 and changing the conversion rate when terminating the polymerization reaction 92%, to obtain the conjugated diene-based rubber gel VII. The properties of the same are shown in Table 1.

Note that none of the conjugated diene-based rubber gels I to VII contained much of any toluene-soluble copolymer ingredient.

Production Example 8

The same procedure was followed as in Production Example 1, except for using a monomer mixture of the composition shown in Table 1, to obtain the conjugated diene-based rubber I. The amount of styrene units and the Mooney's viscosity of the rubber are shown in Table 1. Note that the toluene swelling index of the conjugated diene-based rubber I was not measured as a significant value since no gel was substantially contained.

Production Example 9

A latex mixture obtained by mixing the pre-coagulation latexes of Production Example 1 and Production Example 8 to give a ratio between the conjugated diene-based rubber gel I and the conjugated diene-based rubber I (ratio by weight) of 2/1 was subjected to the same coagulation, recovery, and drying procedure as in Production Example 1 to obtain a rubber composition containing the conjugated diene-based rubber gel I in a ratio of 2/3.

TABLE 1

| Production example | 1 | 2 | 3 | 4 | 5 | 6 | 7 | 8 |
|---|---|---|---|---|---|---|---|---|
| Conjugated diene-based rubber gel | I | II | III | IV | V | VI | VII | — |
| Conjugated diene-based rubber | — | — | — | — | — | — | — | I |
| Monomer mixture (parts) | | | | | | | | |
| Butadiene | 45 | 45 | 57 | 45 | 70 | 45 | 52 | 45 |
| Styrene | 54.7 | 54.8 | 42.7 | 53 | 29.7 | 54.5 | 47.5 | 55 |
| Divinylbenzene | 0.3 | 0.2 | 0.3 | 2 | 0.3 | 0.5 | 0.5 | — |
| Chain transfer agent | | | | | | | | |
| t-dedecylmercaptan | 0.3 | 0.3 | 0.3 | 0.3 | 0.3 | 0.3 | 0.3 | 0.3 |
| Polymerization temperature (° C.) | 10 | 10 | 10 | 10 | 10 | 50 | 50 | 50 |
| Polymer conversion rate at time of end of polymerization (%) | 70 | 70 | 70 | 70 | 70 | 70 | 92 | 70 |
| Copolymer composition found from amount of unreacted monomers | | | | | | | | |
| Amount of butadiene units (%) | 55 | 55 | 65 | 55 | 76 | 55 | 55 | 55 |
| Amount of styrene units (%) | 44.8 | 44.9 | 34.8 | 43.4 | 23.8 | 44.7 | 44.6 | 45 |
| Amount of divinylbenzene units (%) | 0.2 | 0.1 | 0.2 | 1.6 | 0.2 | 0.3 | 0.4 | — |
| Weight average particle size (nm) | 85 | 86 | 85 | 87 | 83 | 89 | 85 | — |
| Amount of styrene units (%) | 45 | 45 | 35 | 45 | 24 | 45 | 45 | 45 |
| Toluene swelling index | 22 | 50 | 23 | 7 | 22 | 24 | 23 | — |
| Mooney's viscosity | — | — | — | — | — | — | — | 46 |

Examples 1 to 6 and Comparative Examples 1 to 3

For each case, a total of 100 parts of the rubber ingredients shown in Table 2, 40 parts of carbon black (i.e., Seast KH made by Tokai Carbon), 20 parts of silica (i.e., VN3G made by Degussa Hulls), 1.6 parts of bis(3-(triethoxysilyl)propyl) tetrasulfide as a silane coupling agent, 3 parts of zinc white, and 2 parts of stearic acid were kneaded by a Bambury mixer at 160° C. for 6 minutes. Next, the mixture obtained was kneaded with 1.4 parts of sulfur and 1.2 parts of N-cyclohexyl-2-benzothiazyl sulfenamide as a vulcanization accelerator to obtain a rubber composition. This rubber composition was cross-linked by a press at 160° C. for 12 minutes to obtain a cross-linked rubber. The results of measurement of the physical properties of the cross-linked rubber are shown in Table 2.

conversion rate when terminating the polymerization reaction of 70% is particularly superior.

The rubber composition obtained by mixing a rubber mixture including a conjugated diene-based rubber gel of the present invention of Example 6 is similarly superior.

TABLE 2

|  | Examples | | | | | | Comp. Ex. | | |
| --- | --- | --- | --- | --- | --- | --- | --- | --- | --- |
|  | 1 | 2 | 3 | 4 | 5 | 6 | 1 | 2 | 3 |
| Formulation of rubber ingredient (parts) | | | | | | | | | |
| Natural rubber | 70 | 70 | 70 | 70 | 70 | 70 | 70 | 70 | 70 |
| Conjugated diene-based rubber gel I | 30 | — | — | — | — | — | — | — | — |
| Conjugated diene-based rubber gel II | — | 30 | — | — | — | — | — | — | — |
| Conjugated diene-based rubber gel III | — | — | 30 | — | — | — | — | — | — |
| Conjugated diene-based rubber gel IV | — | — | — | — | — | — | — | 30 | — |
| Conjugated diene-based rubber gel V | — | — | — | — | — | — | — | — | 30 |
| Conjugated diene-based rubber gel VI | — | — | — | 30 | — | — | — | — | — |
| Conjugated diene-based rubber gel VII | — | — | — | — | 30 | — | — | — | — |
| Conjugated diene-based rubber I | — | — | — | — | — | — | 30 | — | — |
| Rubber mixture I | — | — | — | — | — | 30 | — | — | — |
| Physical properties of cross-linked rubber | | | | | | | | | |
| Tensile strength (MPa) | 27 | 28 | 27 | 26 | 27 | 26 | 25 | 25 | 26 |
| Elongation (%) | 440 | 450 | 430 | 450 | 430 | 450 | 450 | 310 | 380 |
| Abrasion resistance index | 113 | 110 | 107 | 105 | 107 | 105 | 100 | 95 | 110 |
| tanδ (0° C.)/tanδ (60° C.) index | 136 | 127 | 115 | 130 | 115 | 130 | 100 | 135 | 92 |

The rubber composition including a conjugated diene-based rubber gel having a small toluene swelling index of Comparative Example 2 is superior in wet grip, but falls remarkably in elongation, and therefore, is impaired in mechanical properties and also is inferior in abrasion resistance. The rubber composition including a conjugated diene-based rubber gel having a small amount of styrene units of Comparative Example 4 is superior in abrasion resistance, but inferior in wet grip.

The rubber compositions including conjugated diene-based rubber gels of the present invention of Examples 1 to 6, compared with Comparative Example 1, were superior in abrasion resistance and wet grip, without being impaired in mechanical properties. Compared with Examples 1, 4, and 5, one including a conjugated diene-based rubber gel obtained by copolymerizing divinylbenzene at 10° C. and using a Examples 7 to 10 and Comparative Example 4

In each case, the ingredients other than sulfur and the vulcanization accelerator in the formulations of Table 3 were mixed by a Bambury mixer at 160° C. for 6 minutes. Next, the mixture obtained was mixed with the sulfur and vulcanization accelerator by a 50° C. open roll to obtain a rubber composition.

The rubber composition was cross-linked by a press at 160° C. for 20 minutes to obtain a cross-linked rubber. The results of measurement of the physical properties of the cross-linked rubber are shown in Table 3.

TABLE 3

|  | Example | | | | Comp. Ex. |
| --- | --- | --- | --- | --- | --- |
|  | 7 | 8 | 9 | 10 | 4 |
| Formulation (parts) | | | | | |
| Nipol 1712*1 | 96.25 | 123.75 | 110 | 82.5 | 96.25 |
| Amount of oil in Nipol 1712 | 26.25 | 33.75 | 30 | 22.5 | 26.25 |
| Conjugated diene-based rubber gel I | 30 | 10 | 20 | 40 | — |
| Conjugated diene-based rubber I | — | — | — | — | 30 |
| Oil*2 | 7.5 | 0 | 3.75 | 11.25 | 7.5 |
| Carbon black*3 | 70 | 70 | 70 | 70 | 70 |
| Zinc oxide | 5 | 5 | 5 | 5 | 5 |
| Stearic acid | 3 | 3 | 3 | 3 | 3 |
| Sulfur | 1.7 | 1.7 | 1.7 | 1.7 | 1.7 |
| Vulcanization accelerator*4 | 1.4 | 1.4 | 1.4 | 1.4 | 1.4 |
| Physical properties of cross-linked rubber | | | | | |
| Tensile strength (MPa) | 26.1 | 25.1 | 25.6 | 24.5 | 25.7 |

TABLE 3-continued

|  | Example | | | | Comp. Ex. |
|---|---|---|---|---|---|
|  | 7 | 8 | 9 | 10 | 4 |
| Elongation (%) | 440 | 490 | 450 | 420 | 500 |
| Abrasion resistance index | 112 | 105 | 109 | 101 | 100 |
| tanδ (0° C.)/tanδ (60° C.) index | 139 | 105 | 122 | 150 | 100 |

Notes to Table 3
*1: Oil extended styrene-butadiene copolymer rubber (made by Nippon Zeon, amount of styrene units: 23.5% by weight, $ML_{1+4}$, 100° C. = 49, containing 37.5 parts of high aromatic oil with respect to 100 parts of rubber)
*2: Aromatic process oil
*3: Seast 6 (made by Tokai Carbon)
*4: N-cyclohexyl-2-benzothiazylsulfenamide As shown in Examples 7 to 10, the rubber compositions containing conjugated diene-based rubber gels of the present invention all are superior in abrasion resistance and wet grip. Among these, those containing 20 to 30 parts of conjugated diene-based rubber gels, based upon 100 parts of the total rubber ingredients are particularly superior.

The cross-linked rubbers of the present invention shown in the Examples are suitable as parts for tires, in particular tire treads superior in wet grip.

Example 11 and Comparative Example 5

Using a 1.7 liter closed Bambury mixer, the ingredients other than the sulfur and the vulcanization accelerator in the formulation (parts by weight) shown in Table 4, such as the rubber and carbon black, were mixed for 5 minutes, then mixed with the vulcanization accelerator and sulfur by an open roll. The mixed rubber was vulcanized under a pressure of 10 MPa at 160° C. for 20 minutes to prepare a 2 mm thick sheet and 5 mm thick sheet. 5 mm×20 mm samples required for a viscoelasticity test were punched out of the 2 mm thick sheet and provided for evaluating and testing the physical properties. Samples required for the Lambourn abrasion test were punched out of the 5 mm thick sheet and provided for evaluating and testing the physical properties.

The physical properties were evaluated and tested by the following methods. The results are shown in Table 4.

tan δ (0° C.): Measured using a viscoelastic spectrometer (made by Toyo Seiki Seisakusho) under conditions of a temperature of 0° C., an initial strain of 10%, a dynamic strain of 2%, and a frequency of 20 Hz. The larger the value of the tan δ (0° C.), the higher the grip on wet roads shown.

Lambourn abrasion resistance: Measured based on JIS K6301 using a Lambourn abrasion tester made by Iwamoto Seisakusho and shown by an index against the value of Comparative Example 5 as 100. The larger the value, the better the abrasion resistance shown.

TABLE 4

|  | Comp. Ex. 5 | Ex. 11 |
|---|---|---|
| Nipol 1502 | 70 | 70 |
| Conjugated diene-based gel I | — | 30 |
| Conjugated diene-based gel V | 30 | — |
| Carbon black*1 | 40 | 40 |
| Silica*2 | 40 | 40 |
| Silane coupling agent*3 | 4 | 4 |
| Anti-aging agent*4 | 2 | 2 |
| Wax*5 | 1.5 | 1.5 |
| Zinc white*6 | 3 | 3 |
| Stearic acid*7 | 1 | 1 |
| Oil*8 | 50 | 50 |
| Sulfur*9 | 2 | 2 |
| Vulcanization accelerator*10 | 1.5 | 1.5 |
| tanδ (0° C.) | 0.492 | 0.684 |
| Lambourn abrasion resistance (index) | 100 | 102 |

Notes to Table 4
*1: Carbon black DIA-I made by Mitsubishi Chemical.
*2: Wet silica NIPSIL AQ made by Nippon Silica.
*3: Silane coupling agent Si-69 made by Degussa.
*4: Anti-aging agent Santoflex 6 PPD made by Flexsis.
*5: Wax Sannoc made by Ouchi Shinko Chemical.
*6: Zinc oxide no. 3 made by Seido Chemical Industry.
*7: Stearic acid made by NOC.
*8: Aromatic oil made by Fujikosan.
*9: Sulfur made by Karuizawa Refinery
*10: Vulcanization accelerator Santocure CZ made by Flexsis.

INDUSTRIAL APPLICABILITY

As explained above, according to the present invention, there are provided a rubber composition superior in abrasion resistance and wet grip, without impairing the mechanical properties and low heat build-up property and a cross-linked rubber obtained by cross-linking the same.

What is claimed is:

1. A rubber composition comprising (A) a sulfur cross-linkable rubber and (B) a conjugated diene-based rubber gel, having a toluene swelling index of 16 to 70 comprising 40 to 75% by weight of conjugated diene monomer units and 60 to 25% by weight of aromatic vinyl monomer units.

2. A rubber composition as claimed in claim 1, wherein the conjugated diene-based rubber gel (B) is comprising 40 to 75% by weight of conjugated diene monomer units, 60 to 25% by weight of aromatic vinyl monomer units, 0 to 1.5% by weight of polyfunctional monomer units and 0 to 20% by weight of the other monomer units.

3. A rubber composition as claimed in claim 1, wherein the conjugated diene-based rubber gel (B) is comprising 40 to 74.9% by weight of conjugated diene monomer units, 58.5 to 25% by weight of aromatic vinyl monomer units, 0.1 to 1.5% by weight of polyfunctional monomer units and 0 to 20% by weight of the other monomer units.

4. A rubber composition as claimed in claim 1, wherein the conjugated diene-based rubber gel (B) is comprising 45 to 64.9% by weight of conjugated diene monomer units, 35 to 54.5% by weight of aromatic vinyl monomer units, 0.1 to 0.5% by weight of polyfunctional monomer units and 0 to 5% by weight of other monomer units.

5. A rubber composition as claimed in claim 1, wherein the conjugated diene-based rubber gel (B) is comprising 50 to 59.8% by weight of conjugated diene monomer units, 40 to 49.6% by weight of aromatic vinyl monomer units, 0.2 to 0.4% by weight of polyfunctional monomer units and 0 to 1% by weight of the other monomer units.

6. A rubber composition as claimed in claim 1, wherein the toluene swelling index of the conjugated diene-based rubber gel (B) is 20 to 65.

7. A rubber composition as claimed in claim 1, wherein the toluene swelling index of the conjugated diene-based rubber gel (B) is 20 to 40.

8. A rubber composition as claimed in claim 1, wherein an average glass transition temperature of the sulfur cross-linkable rubber (A) is −40° C. or less.

9. A rubber composition as claimed in claim 1, wherein the weight ratio of the sulfur cross-linkable rubber (A) and the conjugated diene-based rubber gel (B) is 99/1 to 50/50.

10. A rubber composition as claimed in claim 1, further comprising a reinforcing material.

11. A cross-linked rubber obtained by cross-linking the rubber composition according to claim 10.

* * * * *